US011770247B2

(12) United States Patent
Rajadurai et al.

(10) Patent No.: US 11,770,247 B2
(45) Date of Patent: Sep. 26, 2023

(54) METHOD FOR PROVIDING END-TO-END SECURITY OVER SIGNALING PLANE IN MISSION CRITICAL DATA COMMUNICATION SYSTEM

(71) Applicant: Samsung Electronics Co., Ltd., Suwon-si (KR)

(72) Inventors: Rajavelsamy Rajadurai, Bangalore (IN); Nishant Gupta, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/573,942

(22) Filed: Jan. 12, 2022

(65) Prior Publication Data

US 2022/0141009 A1 May 5, 2022

Related U.S. Application Data

(63) Continuation of application No. 16/481,324, filed as application No. PCT/KR2018/001223 on Jan. 29, 2018, now Pat. No. 11,316,678.

(30) Foreign Application Priority Data

Jan. 27, 2017 (IN) .............................. 201741003145
Jan. 24, 2018 (IN) ............................ 2017 41003145

(51) Int. Cl.
*H04L 9/40* (2022.01)
*H04L 9/08* (2006.01)
(Continued)

(52) U.S. Cl.
CPC .......... *H04L 9/0861* (2013.01); *H04L 9/0833* (2013.01); *H04L 63/0428* (2013.01);
(Continued)

(58) Field of Classification Search
CPC . H04L 63/0428; H04L 63/062; H04L 63/123; H04L 9/0861; H04L 9/0833;
(Continued)

(56) References Cited

U.S. PATENT DOCUMENTS 4,525,780 A   6/1985   Bratt et al.
7,120,389 B2  10/2006  De La Chapelle et al.
(Continued)

FOREIGN PATENT DOCUMENTS

CN   1579056 A   2/2005
CN   1993897 A   7/2007
(Continued)

OTHER PUBLICATIONS

Chinese Notice of Allowability dated Feb. 9, 2022, issued in a counterpart Chinese Application No. 201880008688.4.
(Continued)

*Primary Examiner* — Lynn D Feild
*Assistant Examiner* — Abdullah Almamun
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments herein provide method and system for end-to-end security over signaling plane in a mission critical data (MCData) communication system. The proposed method includes various ways of securing MCData data payload transmitted over signaling plane using short data service (SDS). The proposed method allows usage of multiple security keys to encrypt the MCData SDS message as per the requirements. Various Keys such as, signaling plane key or media plane key or a dedicated MCData data payload signaling key can be used independently or in a combination
(Continued)

thereof to achieve the desired security context. The proposed method allows protection of all the application level components with the signaling plane security context.

20 Claims, 6 Drawing Sheets

(51) Int. Cl.
*H04W 12/037* (2021.01)
*H04W 12/041* (2021.01)
*H04W 12/106* (2021.01)

(52) U.S. Cl.
CPC ....... *H04W 12/037* (2021.01); *H04W 12/041* (2021.01); *H04W 12/106* (2021.01)

(58) Field of Classification Search
CPC ........... H04L 2209/80; H04L 65/1006; H04W 12/037; H04W 12/041; H04W 12/106; H04W 12/04
See application file for complete search history.

(56) References Cited

U.S. PATENT DOCUMENTS

| | | | |
|---|---|---|---|
| 7,660,600 | B2 | 2/2010 | Koo et al. |
| 8,638,936 | B2 | 1/2014 | Suh et al. |
| 10,382,208 | B2 | 8/2019 | Shields et al. |
| 2002/0112023 | A1 | 8/2002 | Karamanolis et al. |
| 2005/0190920 | A1 | 9/2005 | Ahonen |
| 2016/0128060 | A1 | 5/2016 | Yazdi et al. |
| 2016/0150437 | A1 | 5/2016 | Vannithamby et al. |
| 2017/0012956 | A1* | 1/2017 | Lee ................... H04L 63/0428 |
| 2017/0238154 | A1 | 8/2017 | Vagelos |
| 2018/0083785 | A1 | 3/2018 | Shields et al. |

FOREIGN PATENT DOCUMENTS

| | | |
|---|---|---|
| CN | 101005489 A | 7/2007 |
| CN | 101222324 A | 7/2008 |
| CN | 102187599 A | 9/2011 |
| EP | 0632653 A3 | 1/1995 |
| WO | 02/17659 A1 | 2/2002 |
| WO | 2016/003157 A1 | 1/2016 |

OTHER PUBLICATIONS

3GPP TR 33.880 V0.3.0; 3rd Generation Partnership Project; Technical Specification Group Services and System Aspects Study on Mission Critical Security Enhancements (Release 14), Nov. 2016.
3GPP TR 23.799 V0.5.0; 3rd Generation Partnership Project; Technical Specification Group Services and System Aspects; Study on Architecture for Next Generation System (Release 14), May 2016.
3rd Generation Partnership Project; Technical Specification Group Services and System Aspects; Security of Mission Critical Push To Talk (MCPTT) over LTE; (Release 13), Dec. 17, 2016, pp. 1-89, 3GPP TS 33.179 v13.3.0 XP051230154.
3rd Generation Partnership Project; Technical Specification Group Services and System Aspects; Security of the Mission Critical Service; (Release 14), Nov. 24, 2016, pp. 1-88, 3GPP TS 33.180 v0.1.0 XP051229829.
3rd Generation Partnership Project; Technical Specification Group Services and System Aspects; Study on Mission Critical Security Enhancements (Release 14), Nov. 24, 2016, pp. 1-32, 3GPP TR 33.880 v0.3.0 XP051229833.
European Search Report dated Sep. 23, 2019, issued in European Patent Application No. 18744777.6.
Chinese Office Action dated Jun. 30, 2021, issued in a counterpart Chinese Application No. 20188008688.4.

* cited by examiner

[Fig. 1A]
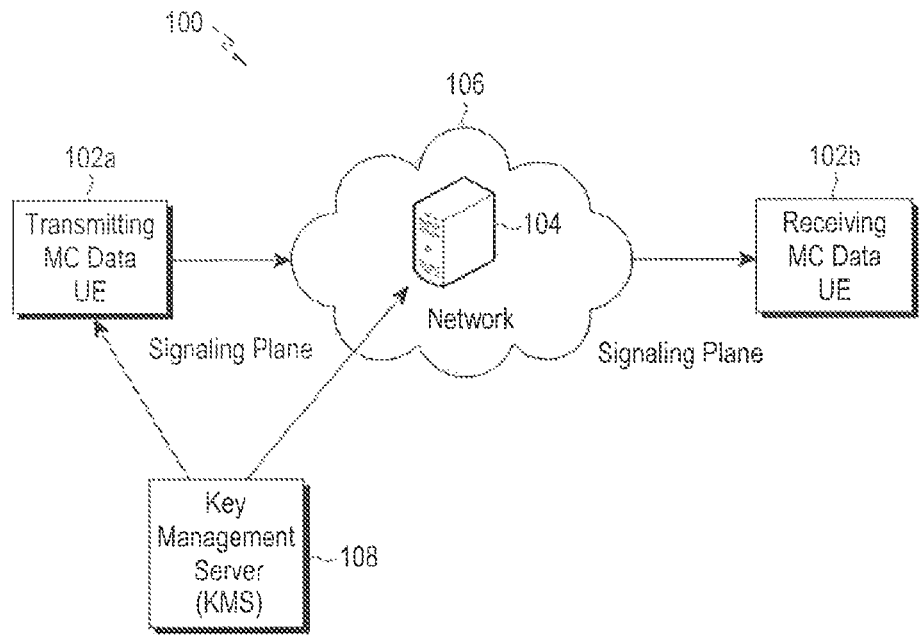
[Fig. 1B]
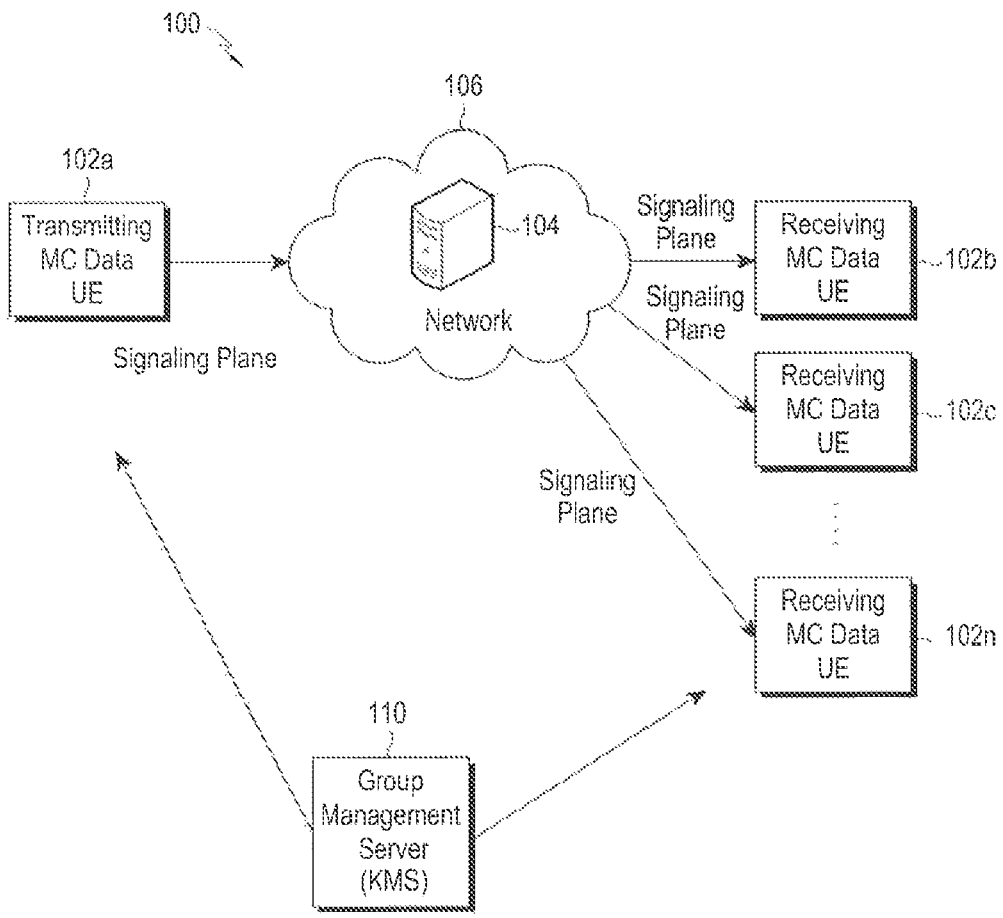

[Fig. 2]
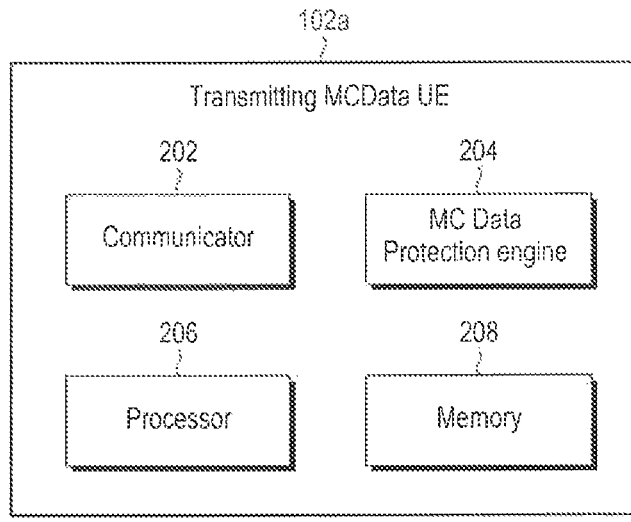
[Fig. 3]
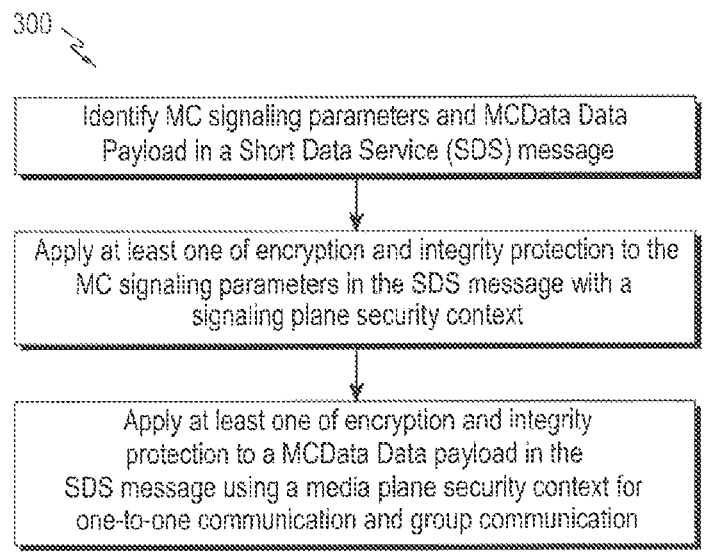

[Fig. 4]
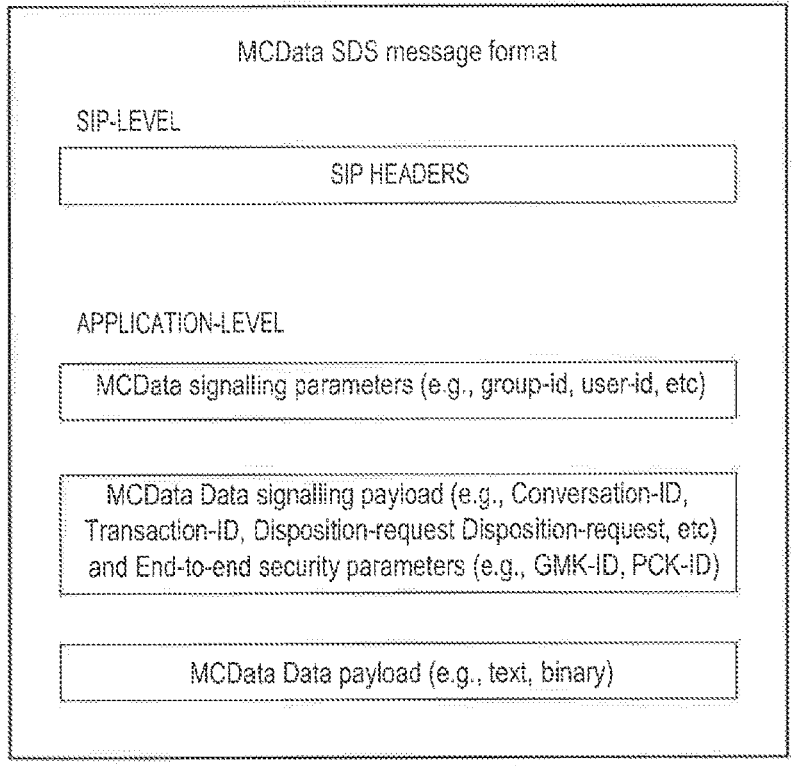
[Fig. 5]
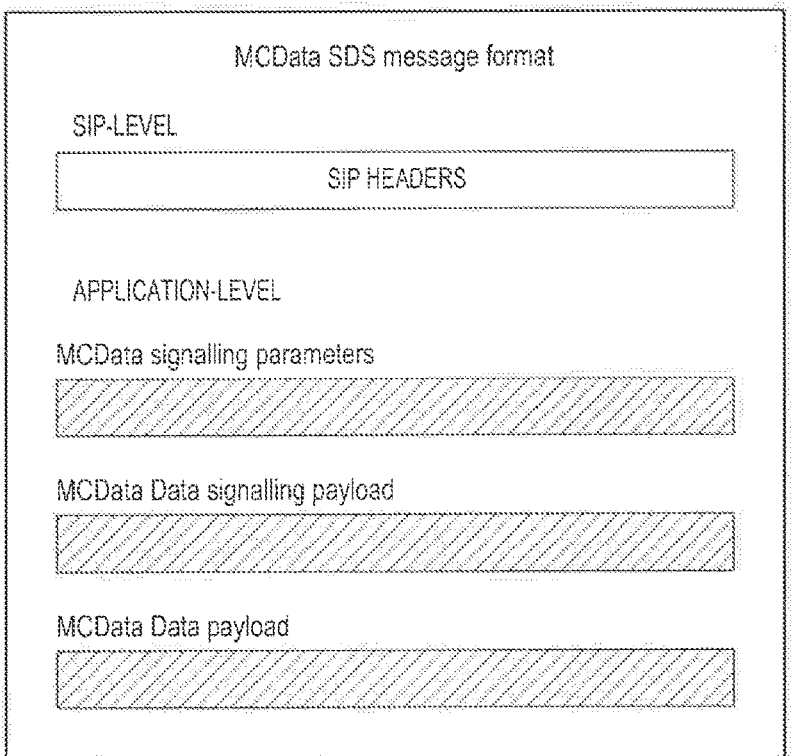
 - Protected with signalling plane security context

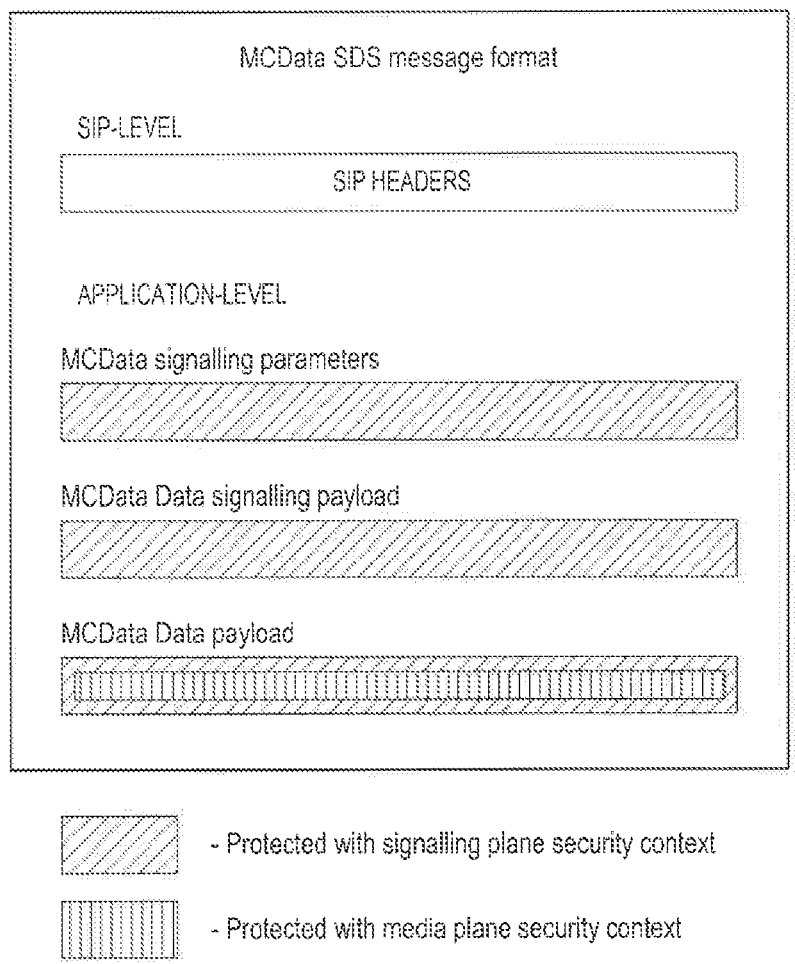

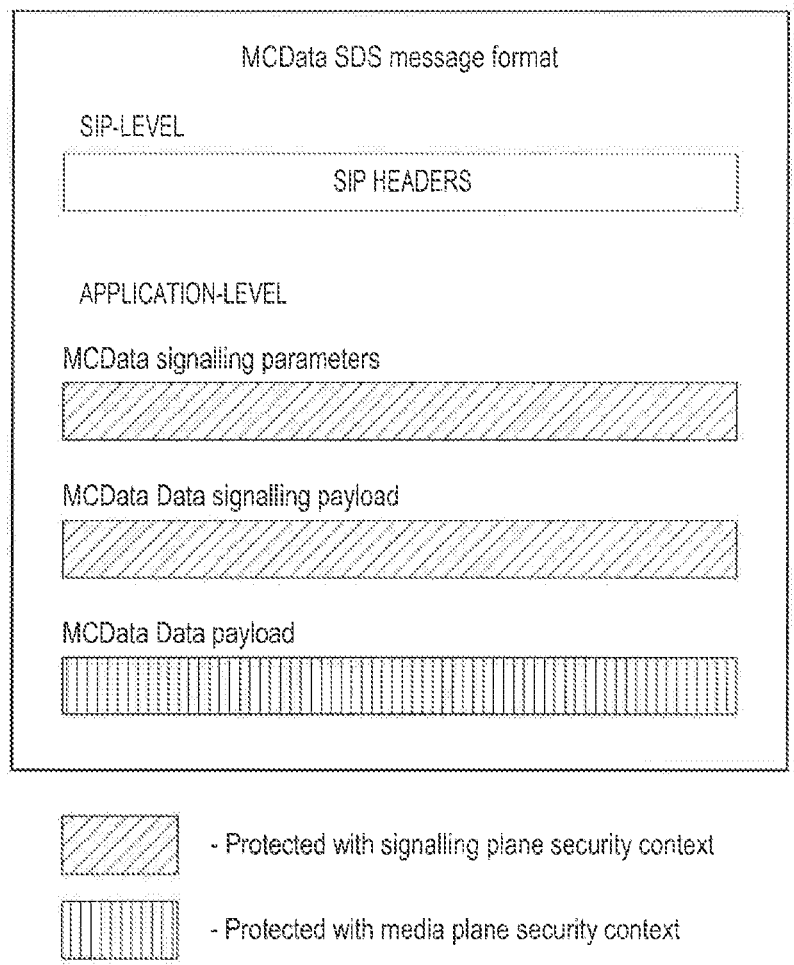

[Fig. 8]
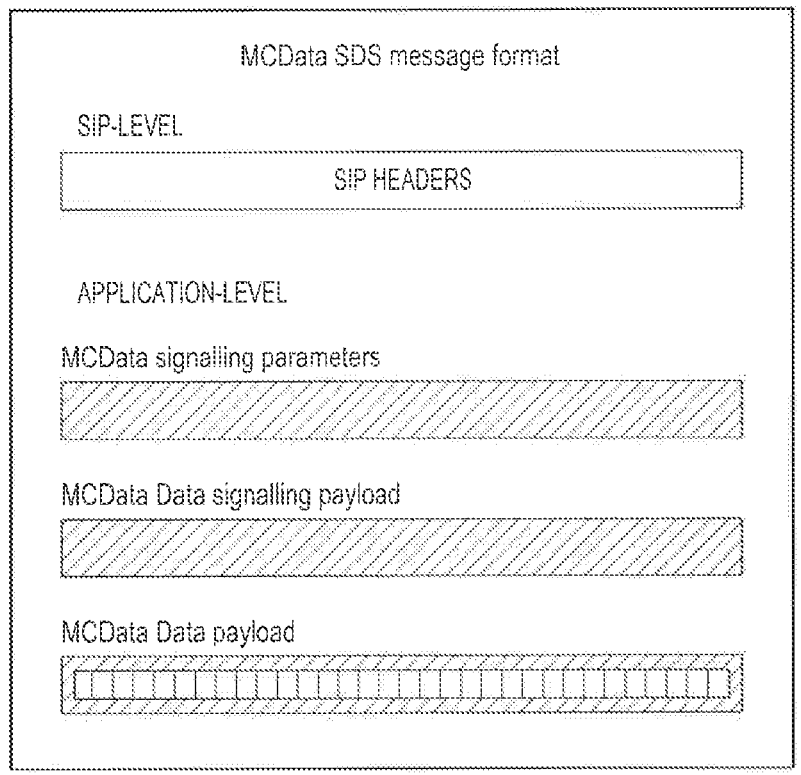
 - Protected with signalling plane security context
 - Protected with dedicated MCData payload signalling pay key

METHOD FOR PROVIDING END-TO-END SECURITY OVER SIGNALING PLANE IN MISSION CRITICAL DATA COMMUNICATION SYSTEM

CROSS-REFERENCE TO RELATED APPLICATION(S)

This application is a continuation application of prior application Ser. No. 16/481,324, filed on Jul. 26, 2019, which is a U.S. National Stage application under 35 U.S.C. § 371 of an International application number PCT/KR2018/001223, filed on Jan. 29, 2018, which is based on and claimed priority of an Indian patent application number 201741003145, filed on Jan. 27, 2017, in the Indian Intellectual Property Office, and of an Indian patent application number 201741003145, filed on Jan. 24, 2018, in the Indian Intellectual Property Office, the disclosure of each of which is incorporated by reference herein in its entirety.

TECHNICAL FIELD

The embodiment herein generally relates to mission critical data (MCData) communication system and more particularly relates to a method and system for providing end-to-end security over signaling plane in MCData communication system.

BACKGROUND ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Public safety networks are used for mission critical (MC) data/voice/video communications. The MC communication may include defined set of MCData services. Such MCData services typically build on existing third generation partnership project (3GPP) transport communication mechanisms provided by the evolved packet system (EPS) architectures to establish, maintain, and terminate the actual communication path(s) among the users. Typically, a MCData server provides centralized support for such MCData services. The MCData server further can facilitate or govern MCData communication among various users part of the network.

In an alternate deployment, such MCData services can be off-network. In such deployments the MCData devices communicate directly with each other without a server for centralized support for the service.

The MCData services are designed to provide one-to-one, one-to-many, and group communications between users. In the present scenario, the public safety community requires services beyond voice i.e. data and video applications. MCData makes frequent use of a set of capabilities and enablers that allows for many end user services to be built on a common platform. A Short data service (SDS) feature is one such capability for use in the MCData Service. The SDS can be used on its own or in combination with other services, or may be used by other services to realize certain features such as sharing of a location, presence-like data, and command instructions to perform specific operations.

The SDS of MCData allows sharing data such as short text messages or application data like binaries or application triggers and so on. MCData allows sharing of such SDS messages over both signaling plane and media plane. As with any mission critical communication, security is essential to protect the sensitive data and the confidentially is required to be maintained between the devices exchanging data.

The conventional systems for MC communication provide end-to-end security solutions only for media plane and for signaling plane. The signaling plane protection always terminates between the MCData UE and network entities (such as MCPTT server and others). Hence effective security methods are necessary to support the SDS communication and its associated features over signaling plane.

The above information is presented as background information only to help the reader to understand the present invention. Applicants have made no determination and make no assertion as to whether any of the above might be applicable as prior art with regard to the present application.

DISCLOSURE

Technical Problem

The principal aspect of the embodiments herein is to provide a method and system for providing end-to-end security over signalling plane in MCData communication system.

Another aspect of the embodiments herein is to provide encryption and integrity protection to MC signalling parameters in a short data service (SDS) message with a signalling plane security context.

Another aspect of the embodiments herein is to provide encryption to a MCData Data payload in the SDS message using a media plane security context for performing one-to-one communication.

Another aspect of the embodiments herein is to provide encryption to a MCData Data payload in the SDS message using a media plane security context for performing a group communication.

Technical Solution

Accordingly embodiments herein provide a method and system for end-to-end security over signalling plane in a mission critical data (MCData) communication system. The method includes identifying, by a transmitting MCData user equipment (UE), MC signalling parameters in a short data service (SDS) message. The method includes applying, by the transmitting MCData UE, at least one of encryption and integrity protection to the MC signalling parameters in the SDS message with a signalling plane security context. The method includes applying, by the transmitting MCData UE, at least one of encryption and integrity protection to a MCData Data payload in the SDS message using a media plane security context for performing one of one-to-one communication and group communication with a receiving MCData UE over the signalling plane.

In an embodiment, the encryption and integrity protection to the MCData Data payload in the SDS message is applied using the media plane security context with a private call key (PCK) generated at the transmitting MCData UE for one-to-one communication.

In an embodiment, an identifier for PCK (PCK-ID) is appended to each of the SDS message for one-to-one communication.

In an embodiment, the encryption and integrity protection to the MCData data payload in the SDS message is applied using the media plane security context with a symmetric group master key (GMK) received from a group management server (GMS) for the group communication.

In an embodiment, an identifier for group key identifier (GMK-ID) is appended to each of the SDS message for the group communication.

A transmitting mission critical data (MCData) user equipment (UE) for providing end-to-end security over signalling plane in a mission critical data (MCData) communication system, the transmitting MCData UE comprises a MC Data protection engine configured for identifying, by a transmitting MCData User Equipment (UE), MC signalling parameters in a short data service (SDS) message. The MCData protection engine configured for applying at least one of encryption and integrity protection to the MC signalling parameters in the SDS message with a signalling plane security context. Further, the MCData protection engine configured for applying at least one of encryption and integrity protection to a MCData Data payload in the SDS message using a media plane security context for performing one of one-to-one communication and group communication with a receiving MCData UE over the signalling plane.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 1A illustrates an example MCData communication system in which End-to-End security is provided for a short data service (SDS) message over signalling plane in one-to-one communication, according to an embodiment as disclosed herein;

FIG. 1B illustrates an example MCData communication system in which End-to-End security is provided for the SDS message over signaling in a group communication, according to an embodiment as disclosed herein;

FIG. 2 is a block diagram illustrating various hardware components of a transmitting MCData User Equipment (UE), according to an embodiment as disclosed herein;

FIG. 3 is a flow diagram illustrating a method for providing the End-to-End security for the short data service (SDS) message over signaling plane, according to an embodiment as disclosed herein;

FIG. 4 illustrates a Generic MCData SDS message format, according to an embodiment as disclosed herein;

FIG. 5 illustrates a MCData SDS message format with point-to-point encryption, according to an embodiment as disclosed herein;

FIG. 6 illustrates a MCData SDS message format with end-to-end encryption, according to an embodiment as disclosed herein;

FIG. 7 illustrates a MCData SDS message format with end-to-end encryption, according to an embodiment as disclosed herein; and FIG. 8 illustrates another MCData SDS message format with end-to-end encryption, according to an embodiment as disclosed herein.

MODE FOR INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "transmitting" and "receiving" herein are used merely for labelling purpose and can be used interchangeably without departing from the scope of the embodiments.

Throughout the document, the term 'protect' refers to encryption and/or integrity protection. Further throughout this document, the terms 'media plane security context' and 'end to end security context' will have same meaning and are used interchangeably.

Prior to describing the embodiments in detail, various details pertaining to the embodiments are presented herein.

The Key provisioning and establishment of the signaling plane and media plane security context for MC services (e.g., MCPTT service) including MCData service is performed as described in 3GPP TS 33.179 and 3GPP TS 33.180. The following are the keys that are used in proposed method:

Signaling plane key: This key is used for protecting (encryption and/or integrity protection) mission critical application information sent over signalling plane. This invention suggests using this key for protecting (encryption and/or integrity protection) information that should be made available at the mission critical servers (point-to-point protection). For example, the key established between the MC client and the MC servers.

Media plane key: This key is conventionally used for protecting (encryption and/or integrity protection) mission critical user payload sent over media plane. This invention suggests using this key for protecting information, such as user payload, that should be not be available at the unauthorized mission critical servers (end-to-end protection). For example, the key established directly between the MC clients, or through the key management server (KMS) and/or Group management server.

Dedicated MCData data payload signaling key: This key is derived by a key management server (KMS) and/or group management server (GMS) and is provisioned to the MC client on the MCData UE using various mechanisms described in 3GPP TS 33.179 and TS 33.180, and is exclusively used for protecting MCData Data payload transmitted over the signalling plane.

The MCData signaling parameters and Data signaling payloads are protected as follows:

Unicast MCData signaling parameters and Data signaling payloads between client and server are protected using the CSK.

MCData signaling parameters and Data signaling payloads between two offline clients are protected using a PCK.

MCData signaling parameters and data signaling payloads between a group of offline clients are protected using a GMK.

The MCData Data payloads are protected as follows:
a) MCData Data payloads end-to-end protected between two online clients are protected using a PCK.
b) MCData Data payloads end-to-end protected between two offline clients are protected using a PCK.
c) MCData Data payloads end-to-end protected between a group of online clients are protected using a GMK distributed by a GMS.
d) MCData Data payloads end-to-end protected between a group of offline clients are protected using a GMK distributed by a GMS.

The embodiments herein provide a method and system for end-to-end security over signaling plane in a MCData communication system. The method includes identifying, by a transmitting MCData user equipment (UE), MC signaling parameters in a short data service (SDS) message. The method includes encrypting and integrity protecting, by the transmitting MCData UE, the MC signaling parameters in the SDS message with a signaling plane security context. The method includes applying, by the transmitting MCData UE, protection to a MCData Data payload in the SDS message using a media plane security context for performing one of one-to-one communication and group communication with a receiving MCData UE over the signalling plane.

In various embodiments, the end-to-end protection of the SDS message of MCData is achieved using the media plane security context even though SDS message is communicated over the signaling plane with or without signaling plane security context.

In some embodiments, for end-to-end protection of the short data service (SDS) message over signaling plane, the media plane security context is established and utilized. The transmitting MCData UE includes the necessary information of the media plane security context which is used for the protection of SDS of MCData over the signaling plane for the receiving MCData UE to decrypt and/or integrity protection verification.

In various embodiments, MCData data payload of SDS message is protected using the media plane security context or using a dedicated MCData Data payload signaling key. Further, the signaling plane security context is applied along with other application level components. This secures the MCData Data payload from points of exchange (SIP and MCData servers) and allows a confidential exchange of MCData Data payload between the MCData UEs from unauthorized network entities. The MCData server can store the encrypted or ciphered MCData Data payload and transmits the encrypted MCData Data payload to authorized entities (i.e., receiving MCData UEs) for lawful interception.

In some embodiments, the MCData Data payload of the SDS message is protected using the media plane security context or using a dedicated MCData Data payload signaling key. Further, MC Signaling parameters and MCData Data signalling payload are protected using the signaling plane security. This secures the MCData Data payload from points of exchange (SIP and MCData servers) and allows a confidential exchange of MCData Data payload between the MCData UEs. The MCData server stores the ciphered MCData Data payload and transmits the MCData Data payload to authorized entities for lawful interception.

Referring now to the drawings, and more particularly to FIGS. 1A through 8, there are shown preferred embodiments.

FIG. 1A illustrates an example MCData communication system in which end-to-end security is provided for a short data service (SDS) message over signalling plane in one-to-one communication, according to an embodiment as disclosed herein.

Before describing the embodiments in detail, the MCData communication system is described herein briefly. In general, as shown in FIGS. 1A-1B, a MCData communication system 100 includes a transmitting MCData UE 102*a*, a group of receiving MCData UEs 102*b*-102*n* and a MCData server 104 in a network 106. The MCData server 104 serves as a centralized server to enable the network 106 to provide MCData service to MCData UEs 102a-102n.

In some examples, the network 106 includes 3GPP E-UTRAN access elements (not shown) and 3GPP E-UTRAN core elements (not shown). For example, the transmitting MCData UE 102a gains access to the network 106 through a LTE-Uu interface (not shown) or through an evolved Node B (eNB, not shown). Further, the MCData server 104 may couple to various access/core elements of the network 106. For example, the MCData server 104 can couple to a serving gateway/packet data gateway through one or more suitable interface reference points. Various core elements such as mobile management entity (MME) and multimedia broadcast/multicast service gateway (MBMS GW) may provide core 3GPP E-UTRAN services to the MCData server 104 and/or the MCData UEs 102a-102n, to facilitate MCData communication services by the network 106.

In an embodiment, the MCData UEs 102a-102n can be for e.g., an electronic device, a User Equipment (UE), or the like. Each of the MCData UEs 102a-102n can include a MCData client (i.e., an application) for communicating with the MCData server 104. The first MCData UE 102a includes a first MCData client; the second MCData UE 102b includes a second MCData client and so on.

The MCData client residing at each of the MCData UEs 102a-102n, acts as user agent for all the MCData application transactions. The MCData client supports SDS, file distribution, data streaming and IP connectivity MCData capabilities utilized by MCData services like conversation management, robots control, enhanced status, database enquiries and secured internet.

The MCData server 104 provides centralized support for MCData services suite. Conversation management, robots, enhanced status, database enquiries and secured internet MCData services requiring one-to-one data or group communication are realized using SDS, file distribution, data streaming and internet protocol (IP) connectivity MCData communication capabilities. All the MCData clients supporting users belonging to a single group are required to use the same MCData server 104 for that group. In one embodiment, HTTP is used as communication transport means for MCData communication.

Now Referring to FIG. 1A, the MCData communication system 100 includes the transmitting MCData UE 102a, the MCData server 104 in the network 106, the receiving MCData UE 102b and a key management server (KMS) 108 for providing security key for encrypting contents in the SDS message. The MCData server 104 facilitates/provides one-to-one unidirectional SDS communication between the first MCData UE 102a and the second MCData UE 102b through the network 106.

In one-to-one communication, the transmitting MCData UE 102a transmits the SDS message to the receiving MCData UE 102b. Initially, the transmitting MCData UE 102a identifies MC signaling parameters in a Short Data Service (SDS) message and MCData data payload. The MC signaling parameters includes MCData signaling parameters, MCData data signaling payload and End to end security parameters (information related to security mechanism). The MCData signaling parameters include generic mission critical services signaling elements but not limited to a group identifier (ID), user ID and so on. The MCData data signaling payload include information elements necessary for identification and management of the MCData messages but not limited to a conversation ID, Transaction ID and a disposition request and so on. The MCData data payload includes the actual user payload for MCData user or application consumption in the form of text, binary, hyperlinks and so on.

In an embodiment, the first MCData UE 102a applies encryption and/or integrity protection to the MC signaling parameters (MCData signaling parameters, end-to-end security parameters and MCData data signaling payload as described above) with the signaling plane security context for transmitting the SDS message to the receiving MCData UE 102b. Further, the transmitting MCData UE 102a applies protection to the MCData data payload in the SDS message using the media plane security context.

In an embodiment, the encryption to the MCData data payload in the SDS message is applied using the media plane security context with a private call key (PCK) generated at the transmitting MCData UE. Further, an identifier for the PCK is appended to each of the SDS message transmitted by the transmitting MCData UE to the receiving MCData UE.

The MCData server 104 decrypts the MC signaling parameters using the PCK received from KMS 108. Further, the MCData server 104 transmits the MCData data payload to the receiving MCData UE 102b

The various embodiments for encrypting the SDS message for one-to-one communication are described in conjunction with figures in the later parts of the description.

FIG. 1B illustrates an example MCData communication system in which End-to-End security is provided for the SDS message over signaling in a group communication, according to an embodiment as disclosed herein.

For group communication, the transmitting MCData UE 102a applies encryption and integrity protection, to the MC signaling parameters in the SDS message with the signaling plane security context.

In an embodiment, the transmitting MCData UE 102a applies encryption to the MCData data payload in the SDS message using the media plane security. It should be noted that the encryption to the MCData data payload in the SDS message is applied using the media plane security context with a symmetric group master key (GMK) received from the group management server (GMS) 110 for performing group communication with the receiving MCData UEs 102b-102n.

The group management server (GMS) 110 generates the GMK and transmits the key to the transmitting MCData UE 102a and the one or more receiving MCData UEs 102b-102n.

In an embodiment, an identifier for group key identifier (GMK-ID) is appended to each of the SDS message for uniquely identifying the SDS message during the group communication.

The receiving MCData UEs 102b-102n decrypt the MCData Data payload using the GMK-ID appended to each of the SDS message.

FIG. 2 is a block diagram illustrating various hardware components of the transmitting MCData UE 102a, according to an embodiment as disclosed herein. The transmitting MCData UE includes a communicator 202, a MCData protection engine 204, a processor and memory.

In an embodiment, the communicator 202 can be configured to transmit the SDS message from the transmitting MCData UE 102a to the receiving MCData UE 102b in case of one-to-one MCData communication.

In another embodiment, the communicator 202 can be configured to transmit the SDS message from the transmitting MCData UE 102a to the receiving MCData UEs 102b-102n in case of one-to-one MCData communication Further, the communicator 202 can also be configured to receive the MCData disposition notification message from the receiving MCData UE 102b based on an information element enabled in the MCData request message and transmit the MCData disposition notification to the first MCData UE 102a. The information element enabled in the MCData request message can be one of a conversation identifier, a payload destination type, a disposition type and a transaction type.

The MCData protection engine 204 can be configured to apply encryption and integrity protection to MC signaling parameters in the SDS message with the signaling plane security context for one-to-one and group communication. Further, the MCData protection engine 204 can be configured to apply encryption to the MCData data payload in the SDS message using the media plane security context for the one of one-to-one communication and the group communication over the signalling plane.

In an embodiment, the processor 206 (for example; a hardware unit, an apparatus, a central processing unit (CPU), a graphics processing unit (GPU), etc.) communicatively coupled to a memory 208 (e.g., a volatile memory and/or a non-volatile memory); the memory 208 includes storage locations configured to be addressable through the processor 206.

In an embodiment, the memory 208 can be configured to store the MCData disposition notification messages received from the second MCData UEs 102b-102n for disposition history interrogation from authorized MCData UEs. The memory 208 may include non-volatile storage elements. Examples of such non-volatile storage elements may include magnetic hard discs, optical discs, floppy discs, flash memories, or forms of electrically programmable memories (EPROM) or electrically erasable and programmable memories (EEPROM). In addition, the memory 208 may, in some examples, be considered a non-transitory storage medium. The term "non-transitory" may indicate that the storage medium is not embodied in a carrier wave or a propagated signal. However, the term "non-transitory" should not be interpreted that the memory 208 is non-movable. In some examples, the memory 208 can be configured to store larger amounts of information than the memory. In certain examples, a non-transitory storage medium may store data that can, over time, change (e.g., in Random Access Memory (RAM) or cache).

FIG. 3 is a flow diagram 300 illustrating a method for providing the end-to-end security for the short data service (SDS) message over signaling plane, according to an embodiment as disclosed herein. The various steps of the flow diagram 300 are performed by the MCData protection engine 204 at the transmitting MCData UE 102a.

At step 302, the method includes identifying MC signaling parameters in a short data service (SDS) message.

At step 304, the method includes applying at least one encryption and integrity protection to the MC signaling parameters in the SDS message with the signaling plane security context.

At step 306, the method includes applying at least one of encryption and integrity protection to the MCData data payload in the SDS message using a media plane security context for one-to-one communication and group communication.

FIG. 4 illustrates a Generic MCData SDS message format in plain text, according to an embodiment as disclosed herein. This message should comprise of 2 levels of information as mentioned below.

SIP-Level: information elements or SIP headers necessary for the MCData SDS message to traverse through the SIP system.

Application-Level: actual MCData SDS message contents meant for MCData application.

To provide security context, the application-level data is segregated into three (3) sub components.

MCData signaling parameters: These are generic mission critical services signaling elements (information elements necessary for redirection of the SDS message to the intended recipient group or the user). These contains information such as group-id, user-id etc. Such MCData signaling parameters is necessarily required at the MC Service servers for appropriate redirection of the messages and should not be encrypted with end-to-end security context, but can be protected using the security context used for protection of signalling plane.

MCData data signaling payload: information elements necessary for identification and management of the MCData SDS messages. These elements such as, conversation identifiers, transaction identifiers, disposition requests, date and time etc. are consumed by both, MCData servers and MCData clients. MCData servers require this information for disposition history management for authorized users. If disposition history management is required these parameters should not be end-to-end encrypted but can be protected using the security context uniquely shared between the MCData server and MCData client. The MCData Data signaling payload contains end-to-end security parameters specifying the cryptographic elements used to protect the data payload. In an embodiment MCData Data signaling payload and end-to-end security parameters can be included as separate components.

MCData data payload: this is the actual user payload for MCData user or application consumption. These parameters may be end-to-end protected even when communicated over the signaling plane. But, if we use the current (3GPP Release-13) state-of-art used for signaling plane protection, then only hop-by-hop or point-to-point protection is achieved.

FIG. 4 illustrates a generic MCData SDS message format in plain text, according to an embodiment as disclosed herein. The MCData SDS message as shown in the FIG. 4 includes information in two levels (i.e., SIP-Level and Application-Level) as mentioned below.

The SIP-Level information includes elements or SIP headers which are required for the MCData SDS message to traverse through the SIP system. The Application-Level includes MCData SDS message contents intended for MCData application.

In order to provide end-to-end security for the SDS message, the Application-Level information is partitioned as three sub components which include MCData signaling parameters, MCData data signaling payload and MCData Data payload.

MCData signaling parameters: These are information elements necessary for redirection of the SDS message to the intended recipient group or the user. These parameters contain information such as group-id, user-id etc. The MC Service signaling information is required at the MCData server 104 for appropriate redirection of the SDS messages and shall not be encrypted with end-to-end security, but can be protected using the security context used for protection of signalling plane.

MCData data signaling payload: The MCData data signaling payload include information elements necessary for identification and management of the MCData SDS messages. These elements such as, conversation identifiers, transaction identifiers, disposition requests, date and time etc. are utilized or consumed by the MCData server 104 and the MCData UEs. The MCData server 104 requires this information for disposition history management for authorized MCData users. If disposition history management is required, then these parameters shall not be end-to-end encrypted but can be protected using the security context uniquely shared between the transmitting MCData UE 102*a*, MCData server 104 and the receiving MCData UE 102*b*.

MCData Data payload: The MCData Data payload represents the user data for MCData user or for application consumption. The MCData Data payload is End-to-End protected while communicated over the signalling plane.

FIG. 5 illustrates a MCData SDS message format with point-to-point encryption, according to an embodiment as disclosed herein. As shown in the FIG. 5, the transmitting MCData UE 102*a* protects the MCData signaling parameters, the MCData Data signaling payload and the MCData Data payload with the signaling plane security context. When signaling plane security context is applied to the MCData Data payload, the MCData Data payload may be readable at the MCData server 104.

FIG. 6 illustrates a MCData SDS message format with end-to-end encryption, according to an embodiment as disclosed herein. As shown in the FIG. 6, the transmitting MCData UE 102*a* protects the MCData signaling parameters, the MCData Data signaling payload in the SDS message with the signaling plane security context.

In an embodiment, the transmitting MCData UE 102*a* protects the MCData Data payload in the SDS message using the media plane security context and further applies signaling plane security context to the MCData Data payload as shown in the FIG. 6.

Hence, by encrypting and further applying integrity protection to the MCData data payload in the SDS message using the media plane security context, the MCData Data payload is not readable at the MCData server 104, which provides higher security and confidentiality. For lawful interception and monitoring, the MCData server 104 may store the encrypted MCData Data payload, which further can be obtained and decrypted by the authorized receiving MCData UEs 102*b*-102*n* using the appropriate keys. The transmitting MCData UE 102*a* includes the necessary media plane security context parameters (such as key ID (for example, MKI), session information (for example, SSRC) to generate the key streams etc.) used for protection and the receiver MCData client uses it to identify the appropriate security context (like, the key used by the transmitting MCData UE 102*a*).

With reference to the FIG. 6, the components of the SDS message are protected as mentioned below.
SIP-Level: Plain text.
Application-Level:
  a. MCData signaling parameters: Protected with signaling plane security context
  b. MCData Data signaling payload: Protected with signaling plane security context
  c. MCData data payload: First protected with the media plane security context, then protected again with the signaling plane security context (i.e., dual encryption)

FIG. 7 illustrates another MCData SDS message format with end-to-end encryption, according to an embodiment as disclosed herein. As shown in the FIG. 7, the transmitting MCData UE 102*a* protects the MCData signaling parameters, the MCData data signaling payload with signaling plane security context and the MCData data payload is protected with the media plane security context.

The encryption of MCData data payload with media plane security context, the MCData data payload is not readable at the MCData server 104, which provides higher security and confidentiality. However, the protected MCData Data payload is available at the SIP servers. For lawful interception and monitoring MCData server 104 or SIP server may store the encrypted MCData Data payload, which further can be obtained and decrypted by the authorized receiving MCData UEs 102*b*-102*n*. The transmitting MCData UE 102*a* includes the necessary media plane security context parameters (like key ID (for example, MKI), session information (for example, SSRC) to generate the key streams etc.) used for protection and the receiver MCData client uses it to identify the appropriate security context (like, the key used by the transmitter).

With reference to the FIG. 6, the components of the SDS message are protected as mentioned below:
SIP-Level: Plain text.
Application-Level:
  a. MCData signaling parameters: Protected with signaling plane security context
  b. MCData Data signaling payload: Protected with signaling plane security context
  c. MCData Data payload: Protected with media plane security context FIG. 8 illustrates an alternate MCData SDS message format with end-to-end encryption, according to an embodiment as disclosed herein. In an embodiment an end-to-end protected MCData SDS message is shown in the FIG. 8, where the transmitting MCData UE 102*a* is provisioned with a dedicated encryption/integrity protection key to encrypt/integrity protect the MCData data payload when communicated over the signaling plane. With the message format as shown in the FIG. 8, the MCData data payload is not readable at the MCData server 104, which provides higher security and confidentiality.

For lawful interception and monitoring, the MCData server 104 or SIP server may store the encrypted MCData Data payload, which can be obtained and decrypted by the receiving MCData UEs 102*b*-102*n*. The transmitting MCData UE 102*a* includes the necessary media plane security context parameters (like key ID (for example, MKI), session information (for example, SSRC) to generate the key streams etc.) used for protection and the receiver MCData client uses it to identify the appropriate security context (like, the key used by the transmitting MCData UE).

With reference to the FIG. 6, the components of the SDS message are protected as mentioned below.
SIP-Level: Plain text.
Application-Level:
  a. MCData signaling parameters: Protected with signaling plane security context
  b. MCData data signaling payload: Protected with signaling plane security context
  c. MCData data payload: Protected with dedicated MCData Data payload signaling plane key, then protected with signaling plane security context The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for transmitting a short data service (SDS) message over a signaling plane in a mission critical data (MCData) communication system by a MCData user equipment (MCData UE), the method comprising:
applying encryption protection and integrity protection to MCData signaling parameters and MCData Data signaling payload in the SDS message with a signaling plane security context;
applying encryption protection and integrity protection to MCData data payload in the SDS message based on an end to end security context; and
transmitting the SDS message comprising the protected MCData data payload, the protected MCData signaling parameters, and the protected MCData Data signaling payload over the signaling plane.

2. The method of claim 1, wherein the encryption protection to the MCData data payload in the SDS message is applied using a media plane security context with a private call key (PCK) for one-to-one communication.

3. The method of claim 1, wherein the SDS message comprises end-to-end security parameters specifying cryptographic elements used to protect the MCData data payload.

4. The method of claim 2, wherein the SDS message comprises an identifier for the PCK.

5. The method of claim 1,
wherein the encryption protection to the MCData data payload in the SDS message is applied using a media plane security context with a group master key (GMK) for a group communication,
wherein the GMK is received from a group management server (GMS), and
wherein an identifier for GMK is appended to the SDS message.

6. The method of claim 1, wherein the MCData signaling parameters comprise at least one of group ID or user ID.

7. The method of claim 1, wherein the MCData data signaling payload comprises at least one of conversation identifiers, transaction identifiers, or disposition requests.

8. The method of claim 1, wherein the MCData signaling parameters and the MCData data signaling payload between the MCData UE and a server are protected using a client-server key (CSK).

9. The method of claim 1, wherein the MCData signaling parameters and the MCData data signaling payload between two offline clients are protected using a private call key (PCK).

10. The method of claim 1, wherein the MCData signaling parameters and the MCData data signaling payload between a group of offline clients are protected using a group management key (GMK).

11. A mission critical data (MCData) user equipment (UE) for transmitting a short data service (SDS) message, over a signaling plane in a MCData communication system, the MCData UE comprising:
a transceiver; and
at least one processor coupled with the transceiver and configured to:
apply encryption protection and integrity protection to MCData signaling parameters and MCData Data signaling payload in the SDS message with a signaling plane security context,
apply encryption protection and integrity protection to MCData data payload in the SDS message based on an end to end security context, and
transmit the SDS message comprising the protected MCData data payload, the protected MCData signaling parameters, and the protected MCData data signaling payload over the signaling plane.

12. The UE of claim 11, wherein the encryption protection to the MCData data payload in the SDS message is applied using a media plane security context with a private call key (PCK) for one-to-one communication.

13. The UE of claim 11, wherein the SDS message comprises end-to-end security parameters specifying cryptographic elements used to protect the MCData data payload.

14. The UE of claim 12, wherein the SDS message comprises an identifier for the PCK.

15. The UE of claim 11,
wherein the encryption protection to the MCData data payload in the SDS message is applied using a media plane security context with a group master key (GMK) for a group communication,
wherein the GMK is received from a group management server (GMS), and
wherein an identifier for GMK is appended to the SDS message.

16. The UE of claim 11, wherein the MCData signaling parameters comprise at least one of group ID or user ID.

17. The UE of claim 11, wherein the MCData data signaling payload comprises at least one of conversation identifiers, transaction identifiers, or disposition requests.

18. The UE of claim 11, wherein the MCData signaling parameters and the MCData data signaling payload between the MCData UE and a server are protected using a client-server key (CSK).

19. The UE of claim 11, wherein the MCData signaling parameters and the MCData data signaling payload between two offline clients are protected using a private call key (PCK).

20. The UE of claim 11, wherein the MCData signaling parameters and the MCData data signaling payload between a group of offline clients are protected using a group management key (GMK).

* * * * *